United States Patent [19]

Shingu et al.

[11] Patent Number: 4,485,080
[45] Date of Patent: Nov. 27, 1984

[54] PROCESS FOR THE PRODUCTION OF DIAMOND POWDER

[75] Inventors: Hideo Shingu; Keiichi Ishihara, both of Kyoto; Akira Doi, Itami; Naoji Fujimori, Itami, all of Japan

[73] Assignee: Sumitomo Electric Industries, Ltd., Osaka, Japan

[21] Appl. No.: 560,403

[22] Filed: Dec. 12, 1983

[30] Foreign Application Priority Data

Dec. 13, 1982 [JP] Japan ................................ 57-218980

[51] Int. Cl.³ .............................................. C01B 31/06
[52] U.S. Cl. ............................ 423/446; 156/DIG. 68
[58] Field of Search ............... 423/446; 156/DIG. 68; 148/403

[56] References Cited

U.S. PATENT DOCUMENTS

| | | | |
|---|---|---|---|
| 1,637,291 | 7/1927 | Barnett | 423/446 |
| 3,268,457 | 8/1966 | Giardini et al. | 423/446 |
| 3,607,060 | 9/1971 | Kuratomi | 423/446 |
| 4,406,871 | 9/1983 | Samoilovich et al. | 423/446 |

FOREIGN PATENT DOCUMENTS

| | | | |
|---|---|---|---|
| 1943656 | 12/1970 | Fed. Rep. of Germany | 423/446 |
| 43-25006 | 10/1968 | Japan | 423/446 |

*Primary Examiner*—John Doll
*Assistant Examiner*—Steven Capella
*Attorney, Agent, or Firm*—Wenderoth, Lind & Ponack

[57] ABSTRACT

Diamond powder is produced without using an ultra-high pressure apparatus by a process comprising melting carbon and a metal capable of dissolving carbon to form a liquid, subjecting the liquid to quenching at an ultra-high cooling rate to form an amorphous metal, heating the amorphous metal at a predetermined temperature to precipitate diamond crystals from the amorphous metal and then separating the phase of the amorphous metal other than the diamond to obtain diamond powder.

11 Claims, No Drawings

4,485,080

PROCESS FOR THE PRODUCTION OF DIAMOND POWDER

BACKGROUND OF THE INVENTION

1. Field of the Invention

This invention relates to a process for the production of diamond powder without using any ultra-high pressure apparatus.

2. Description of the Prior Art

Synthesis of diamond has already been put to practical use by the use of an ultra-high pressure apparatus. This method consists in heating graphite and a metal such as Ni under an ultra-high pressure, e.g. several ten thousands atm to form diamond.

However, the price of such synthetic diamond powder is not much lower than that of natural diamond powder, since the ultra-high pressure apparatus itself consists of expensive and complicated equipment and needs a cemented carbide vessel for producing a high pressure, which is not only too expensive but also hard to be large-scaled. Furthermore, it has eagerly been desired to develop a method of producing diamond powder with a uniform particle size on a large scale, because classification of the fine powder used for polishing costs a great deal. On the other hand, a number of methods of synthesizing diamond from gaseous phase have been proposed, but in this case, diamond is obtained in the form of a film and there has been developed no effective method of obtaining diamond in the form of a powder.

SUMMARY OF THE INVENTION

It is an object of the present invention to provide a process for the production of diamond powder without using any ultra-high pressure apparatus.

It is another object of the present invention to provide a process for the production of diamond powder by converting carbon into diamond through an unstable phase of amorphous alloy.

These objects can be attained by a process for the production of diamond powder, which process comprises (A) a step of melting carbon and one or more metals to form a liquid, (B) a step of subjecting the liquid to ultra-high speed quenching or rapid solidification to form an amorphous metal, (C) a step of heating the amorphous metal at a predetermined temperature to precipitate diamond from the amorphous metal and (D) a step of separating the phase of the amorphous metal other than diamond to obtain diamond powder.

DETAILED DESCRIPTION OF INVENTION

The inventors have made various efforts to find a process for producing on a large scale diamond powder and consequently, have reached the present invention. That is, the present invention provides a process for the production of diamond powder by converting carbon into diamond through an unstable phase of amorphous alloy, without use of an ultra-high pressure apparatus.

The free energy is a barometer of determining formation of a substance. It is natural that a phase of low free energy appears under equilibrium state, but a substance existing at ordinary temperature cannot always be given under conplete equilibrium state. Rather, the existing phase depends upon the heat history up to this state, which can be said to be a determinate factor.

Since diamond is a transformed phase of carbon under an ultra-high pressure, i.e. several ten thousands atm, the free energy under atmospheric pressure is higher than that of graphite and the formation of it has been considered impossible.

Of course, the formation of diamond cannot be expected under equilibrium state. Considering that formation of diamond is made possible by intentional realization of a nonequilibrium state, however, the inventors have made studies on the realization of a nonequilibrium state and thus have found a novel method therefor. The present invention is based on this finding.

The present invention can be realized by the following four steps:

The first step consists in heating and melting a mixture of carbon and one or more metals with a predetermined composition at a temperature of higher than the melting point to form a liquid.

The second step consists in subjecting this liquid to quenching or rapid solidification to form an amorphous metal.

The third step consists in heating the amorphous metal at a predetermined temperature to precipitate diamond from the amorphous metal.

The fourth step consists in separating the phase other than diamond to obtain diamond powder.

The first step is a step necessary for the subsequent second step and if the melting in the first step is insufficient, effective quenching at an ultra-high speed cannot be given. Generally, carbon and one or more metals are used in a proportion of 2–40 atomic %, preferably 5–30 atomic % of carbon, and heated at a temperature of 1000° to 2000° C.

In the second step, an amorphous metal is formed by quenching or rapid solidification. This quenching can be carried out by any methods of using rolls or spraying liquid drops against a revolving disk with substantially similar effects. However, a cooling speed of $1 \times 10^4$ °K/sec or more, preferably $5 \times 10^5$ °K/sec or more is generally required in any methods.

The third step is the most important step for the present invention. The heating condition depending largely upon the composition of an alloy or metal used should be so adjusted that carbon be readily moved, and the heating temperature should be generally 100° C. or higher, preferably 200° to 700° C. In any case, precise control of the temperature is required, because the shape of diamond particles is thereby affected to a great extent. This heat treatment is generally carried out for a period of time of at least 10 hours.

The fourth step is a step of taking out diamond powder formed. Diamond is not soluble in any solvents and accordingly, the other phase can be dissolved out by the use of an acid or alkali to thus obtain diamond as a residue. As the acid, there can be used for example hydrochloric acid, sulfuric acid, nitric acid, aqua regia and the like and as the alkali, there can be used for example caustic soda, caustic potassium, red prussiate salts of alkali metals and the like. When the other phase is of a carbide, an alkali such as caustic soda can be used and when it is of an oxide, an acid such as hydrofluoric acid can be used. In addition, electrolysis in an acid or alkali is also effective for dissolving out the other phase.

In the case of Co, a mixed solution of perchloric acid and alcohol is suitable and in the case of Cr, a mixed solution of perchloric acid and acetic acid is suitable. On the other hand, the metal or alloy after the heat treatment of the third step is very brittle, so diamond powder can also be separated by grinding finely the metal or alloy by the commonly used grinding method, followed by gravity concentration. The above described dissolving treatment can of course be carried out after this grinding treatment.

The metal or alloy used for forming an amorphous metal in the first step should be one capable of containing carbon as a solid solution. To this end in particular, metals such as Fe, Ni, Co, Cr and the like can favourably be used individually or in combination. Furthermore, additive elements such as Si, Ge, Mn, B, Al, P, Pb etc. can optionally be added for the purpose of making amorphous metal or alloy or precipitating diamond.

The following examples are given in order to illustrate the present invention in greater detail without limiting the same.

EXAMPLE 1

20 atomic % (5.0 wt %) of carbon, 40 atomic % (46.3 wt %) of iron and 40 atomic % (48.7 wt %) of nickel were individually weighed in the form of powders, and heated and melted at 1470° C. by high frequency induction heating. The resulting liquid was poured into water-cooled rolls to prepare a tape. In this case, the cooling rate measured was $5 \times 10^4$ °K/sec. When this tape was subjected to X-ray diffraction, there was found no peaks, from which it was confirmed that the metal was amorphous.

This tape was then annealed at 200° C. for 60 hours and cooled. The tape was then immersed in aqua regia and 20N aqueous solution of sodium hydroxide alternatively and dissolved to retain a powder. The thus resulting powder was subjected to X-ray diffraction to find diamond powder.

EXAMPLE 2

44 atomic % (41.2 wt %) of cobalt, 36 atomic % (55.0 wt %) of molybdenum and 20 atomic % (3.8 wt %) of carbon were melted at 1450° C., sprayed in the form of liquid drops from a nozzle to a revolving water-cooled disk and thus rapidly cooled. In this case, the cooling rate measured was about $2 \times 10^5$ °K/sec. It was confirmed by X-ray diffraction that the resulting powder was amorphous. When this powder was subjected to annealing at 250° C. for 100 hours, it was found by means of a scanning type electron microscope that diamond crystals precipitated. The metallic components were dissolved by electrolysis in a mixed solution of acetic acid and nitric acid and by using aqueous solution of sodium hydroxide to retain diamond powder.

EXAMPLE 3

80 atomic % (89.8 wt %) of iron, 15 atomic % (9.3 wt %) of phosphorus and 8 atomic % (1.9 wt %) of carbon were melted at 1250° C. and rapidly cooled in the similar cooling method to Example 2 to obtain an amorphous alloy. When the resulting amorphous alloy was annealed at 265° C. for 360 hours, it was found by X-ray diffraction that diamond crystals precipitated. The annealed alloy being very brittle was readily ground and subjected to gravity concentration to recover diamond powder.

What is claimed is:

1. A process for the production of diamond powder, which process comprises (A) a step of melting carbon and at least one metal capable of containing carbon as a solid solution to form a liquid, (B) a step of subjecting the liquid to rapid solidification to form an amorphous metal or alloy, (C) a step of heating the amorphous metal or alloy at a predetermined temperature to precipitate diamond from the amorphous metal or alloy and (D) a step of separating the phase of the amorphous metal or alloy other than the diamond to obtain diamond powder.

2. The process of claim 1, wherein the metal is selected from the group consisting of iron, nickel, cobalt and chromium.

3. The process of claim 1, wherein the metal further contains at least one element selected from the group consisting of silicon, germanium, boron, phosphorus, manganese, aluminum and lead.

4. The process of claim 1, wherein the melting is carried out at a temperature of higher than the melting point.

5. The process of claim 1, wherein the rapid solidification is carried out at a rate of $1 \times 10^4$ °K/sec or more.

6. The process of claim 1, wherein the heating is carried out at a temperature of at least 100° C.

7. The process of claim 1, wherein the separating is carried out by dissolving the amorphous metal or alloy in an alkali acid.

8. The process of claim 1, wherein the separating is carried out by grinding finely the amorphous metal or alloy and subjecting to gravity concentration.

9. The process of claim 7, wherein the dissolving is carried out by the aid of electrolysis.

10. The process of claim 1, wherein the quenching is carried out by pouring the liquid into cooled rolls.

11. The process of claim 1, wherein the quenching is carried out by spraying the liquid from a nozzle to a cooled revolving disk.

* * * * *